United States Patent [19]

Furumoto et al.

[11] 4,191,978
[45] Mar. 4, 1980

[54] METHOD FOR ADJUSTING ROTARY HEAD TYPE MAGNETIC VIDEO RECORDING AND REPRODUCING APPARATUS

[75] Inventors: Mitsunobu Furumoto, Yao; Osahiko Yano, Kadoma; Satoshi Kikuya, Katano; Kanji Kubo, Katano; Hideki Sakumoto, Katano, all of Japan

[73] Assignee: Matsushita Electric Industrial Co., Ltd., Osaka, Japan

[21] Appl. No.: 855,707

[22] Filed: Nov. 29, 1977

[30] Foreign Application Priority Data

Dec. 3, 1976 [JP] Japan .................................. 51-145788

[51] Int. Cl.² .......................... G11B 5/56; G11B 27/32
[52] U.S. Cl. ............................................ 360/75; 360/33
[58] Field of Search ....................... 360/19, 22, 75, 70, 360/33, 11, 35, 31

[56] References Cited

U.S. PATENT DOCUMENTS

| | | | |
|---|---|---|---|
| 3,283,085 | 11/1966 | Lemke | 360/19 |
| 3,596,004 | 7/1971 | Prochnow | 360/109 |
| 3,668,310 | 6/1972 | Yano | 360/31 |
| 3,821,467 | 6/1974 | Iketaki | 360/70 |
| 3,890,640 | 6/1975 | Yabu | 360/35 |
| 3,932,894 | 1/1976 | Arter | 360/70 |

*Primary Examiner*—Bernard Konick
*Assistant Examiner*—Alan Faber
*Attorney, Agent, or Firm*—Stevens, Davis, Miller & Mosher

[57] ABSTRACT

A method for positioning a composite head comprising a control head and an audio head in a rotary head type magnetic video recording and reproducing apparatus at a precise spacing relative to a mounting position of the rotary head is disclosed. A video signal is recorded intermittently for each group of a predetermined number of video tracks on a reference tape and an audio signal is also recorded intermittently in association with the intermittently recorded video signal. The composite head is adjusted and positioned such that the intermittent relationship existing between a reproduced video signal and a reproduced audio signal is the same as the intermittent relationship existing between the video signal and audio signal during recording.

5 Claims, 11 Drawing Figures

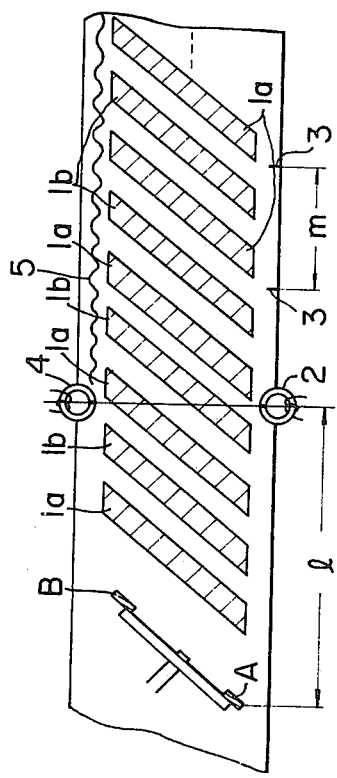
FIG. 1 PRIOR ART
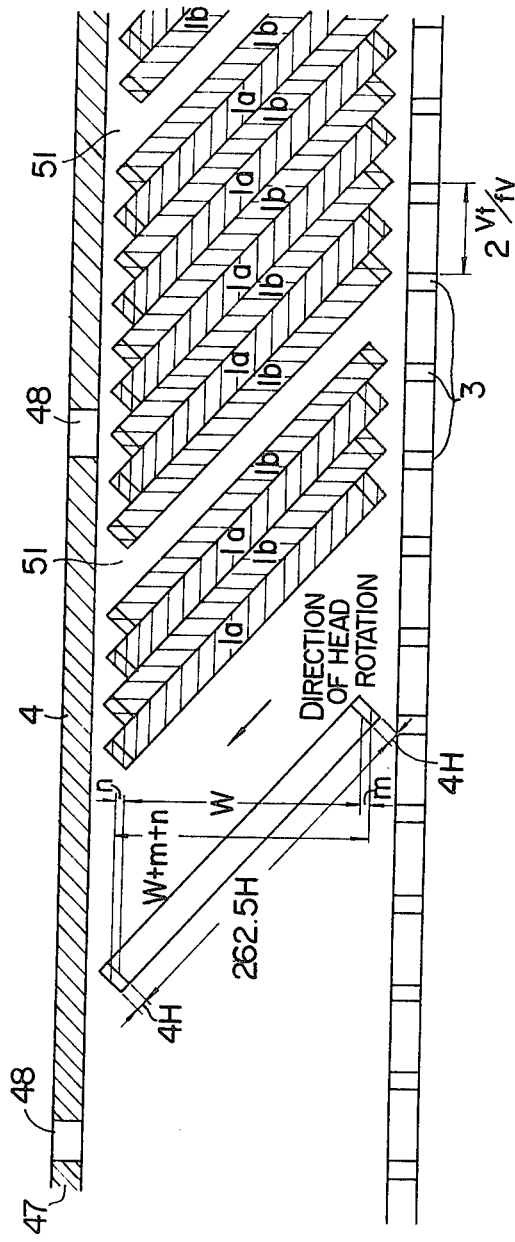
FIG. 3a (CORRESPONDING TO FIG. 5)

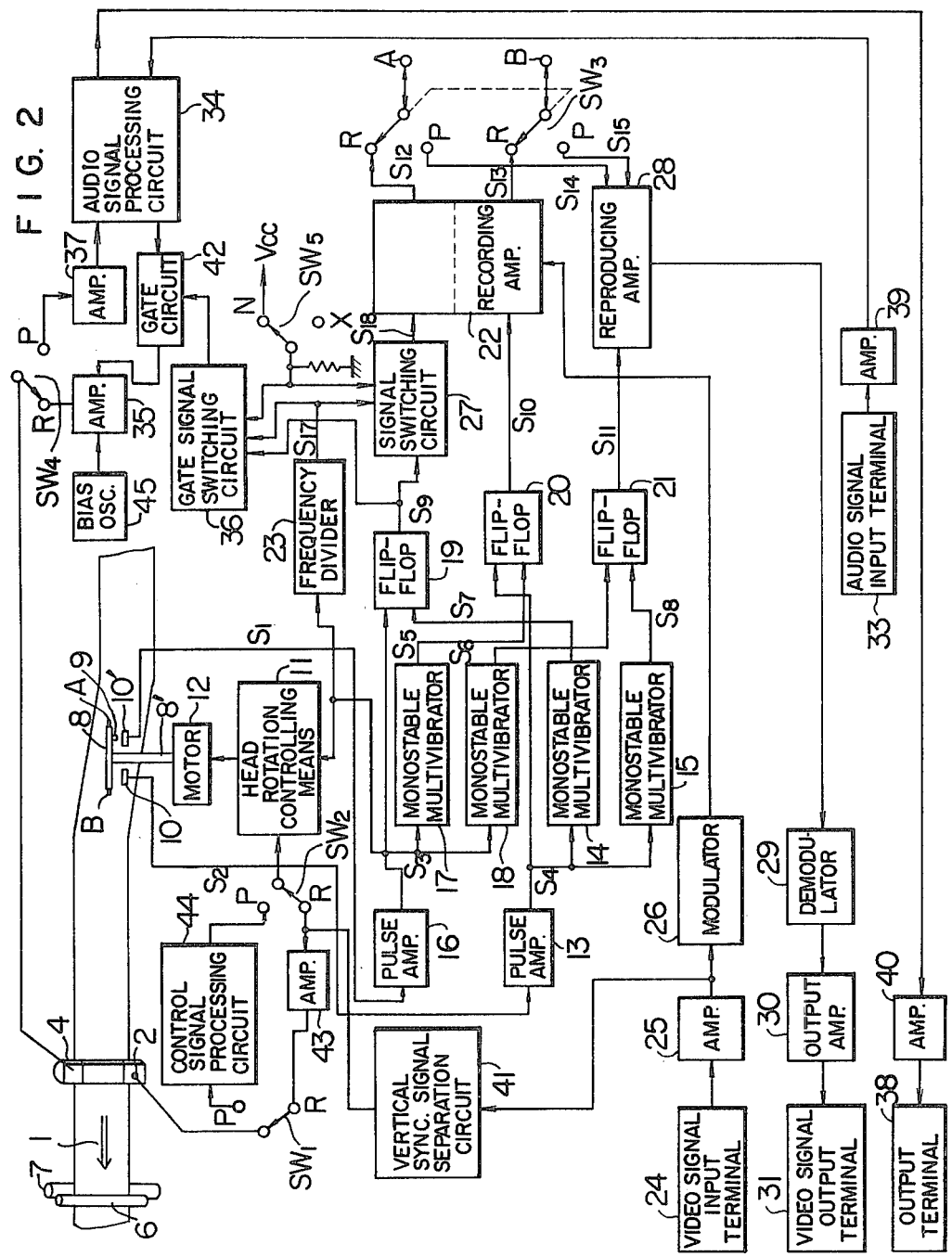

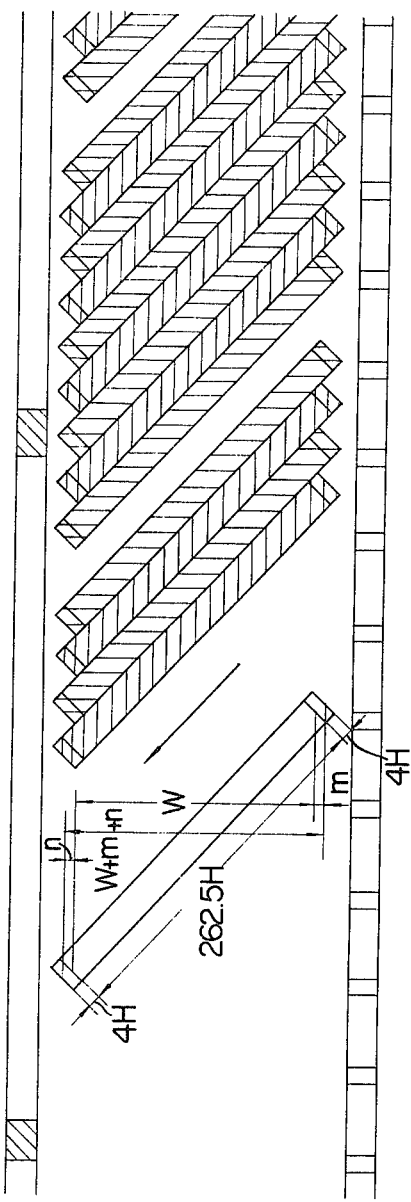

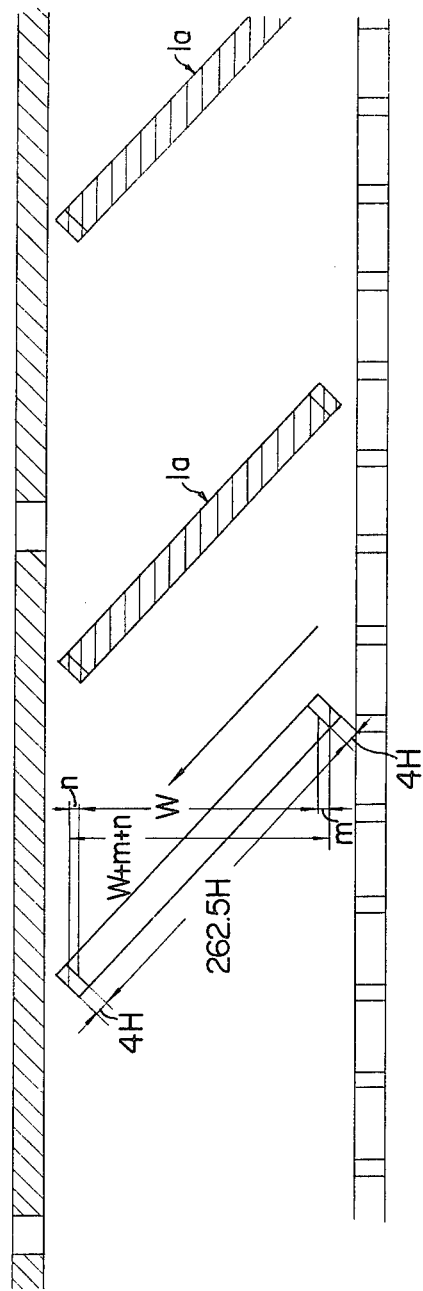

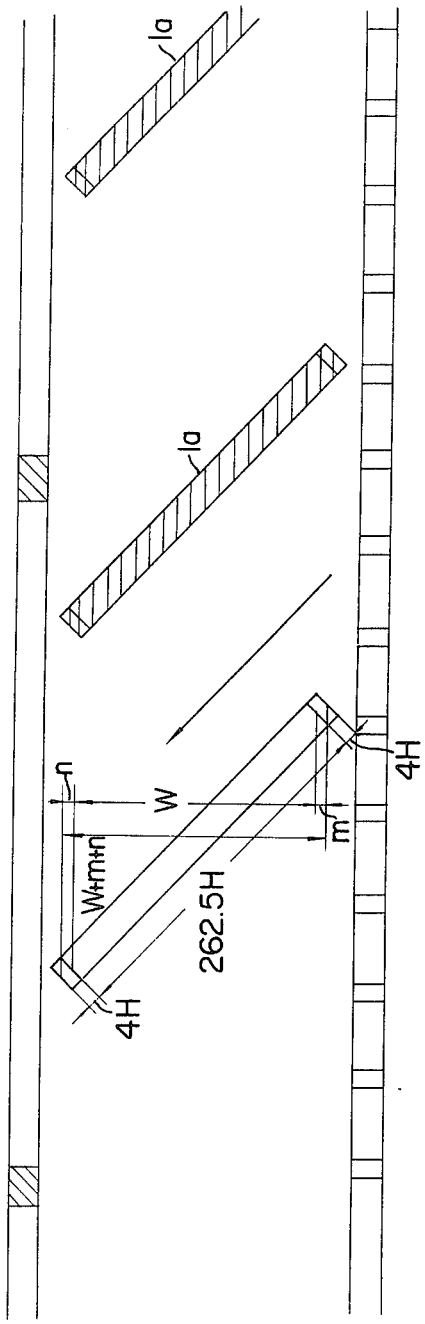

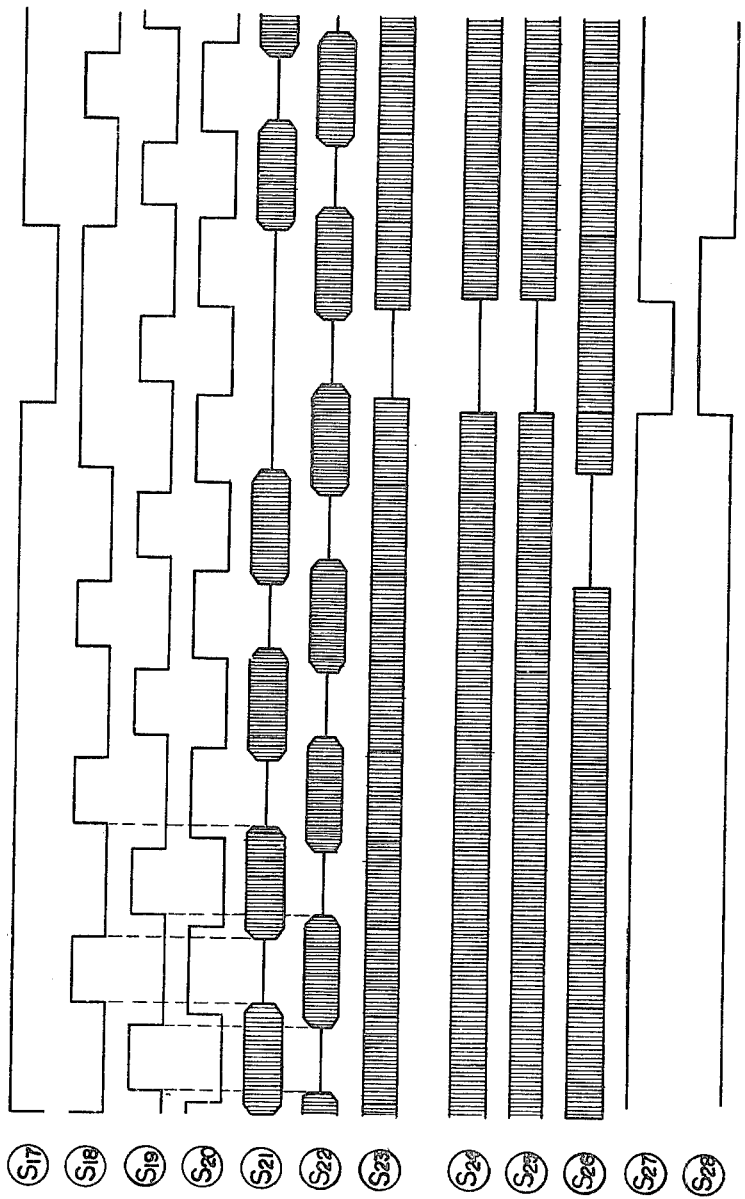

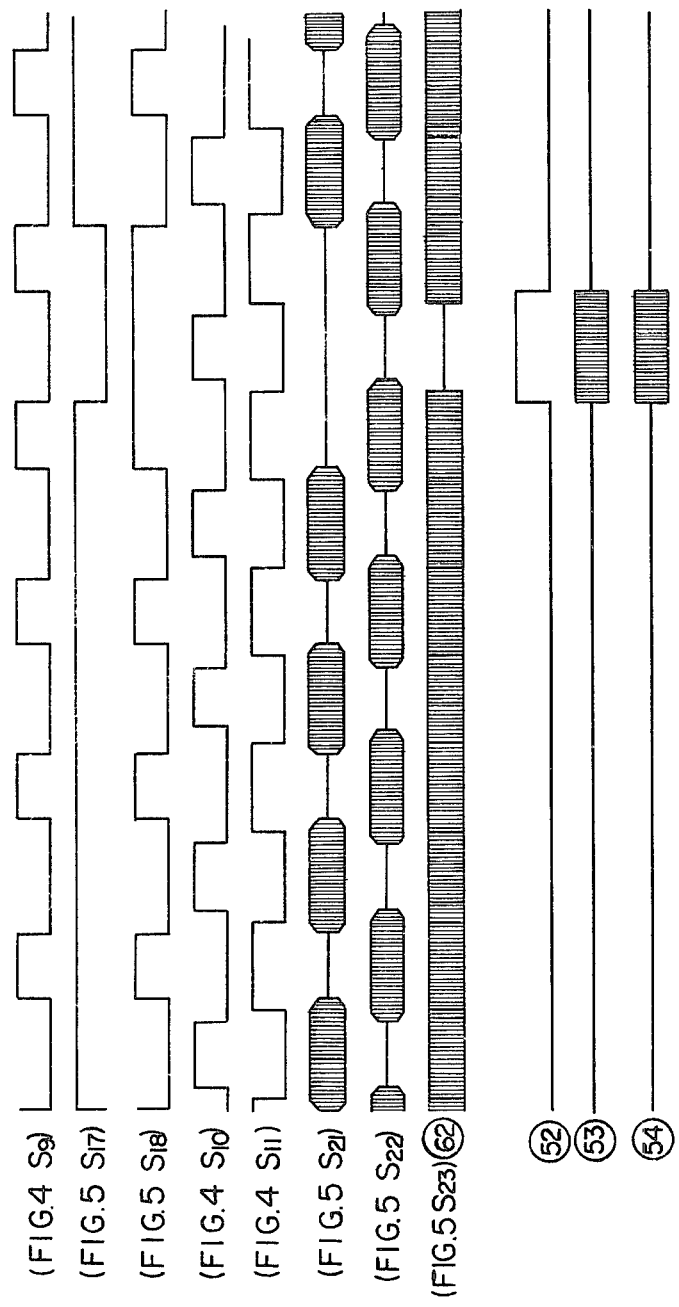

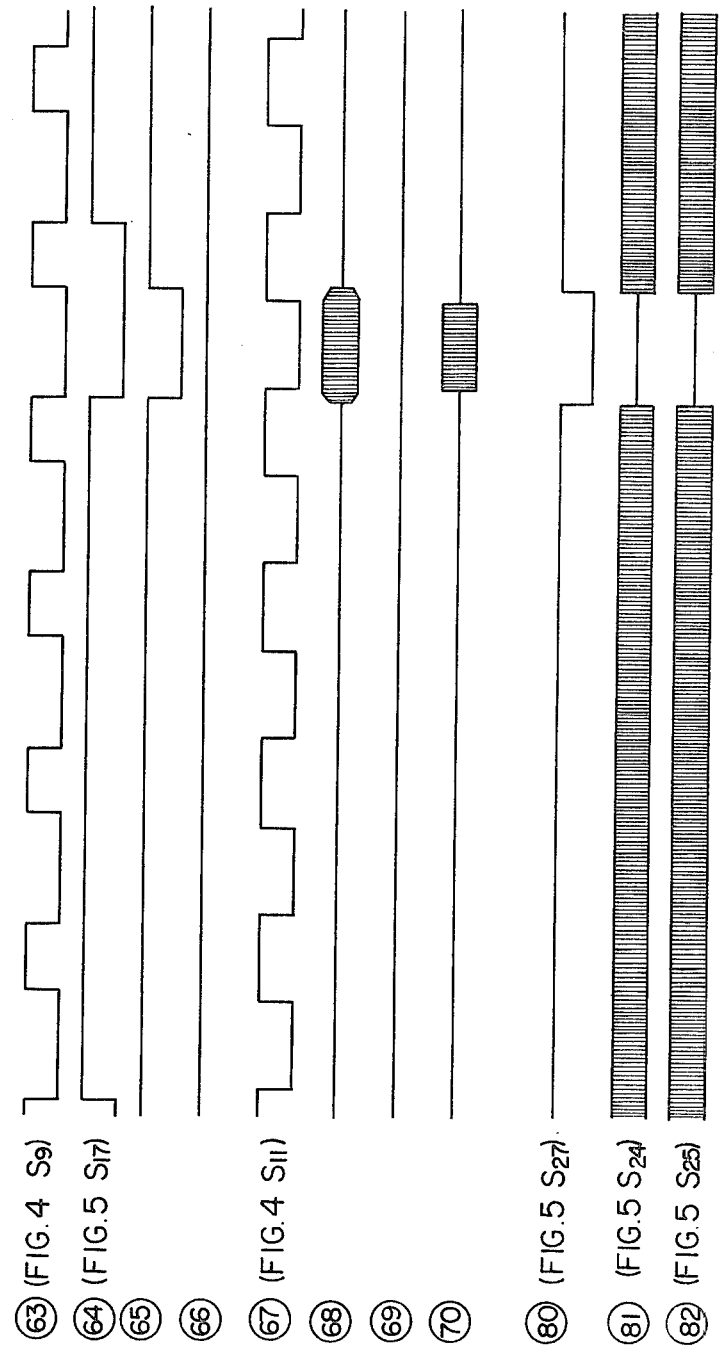

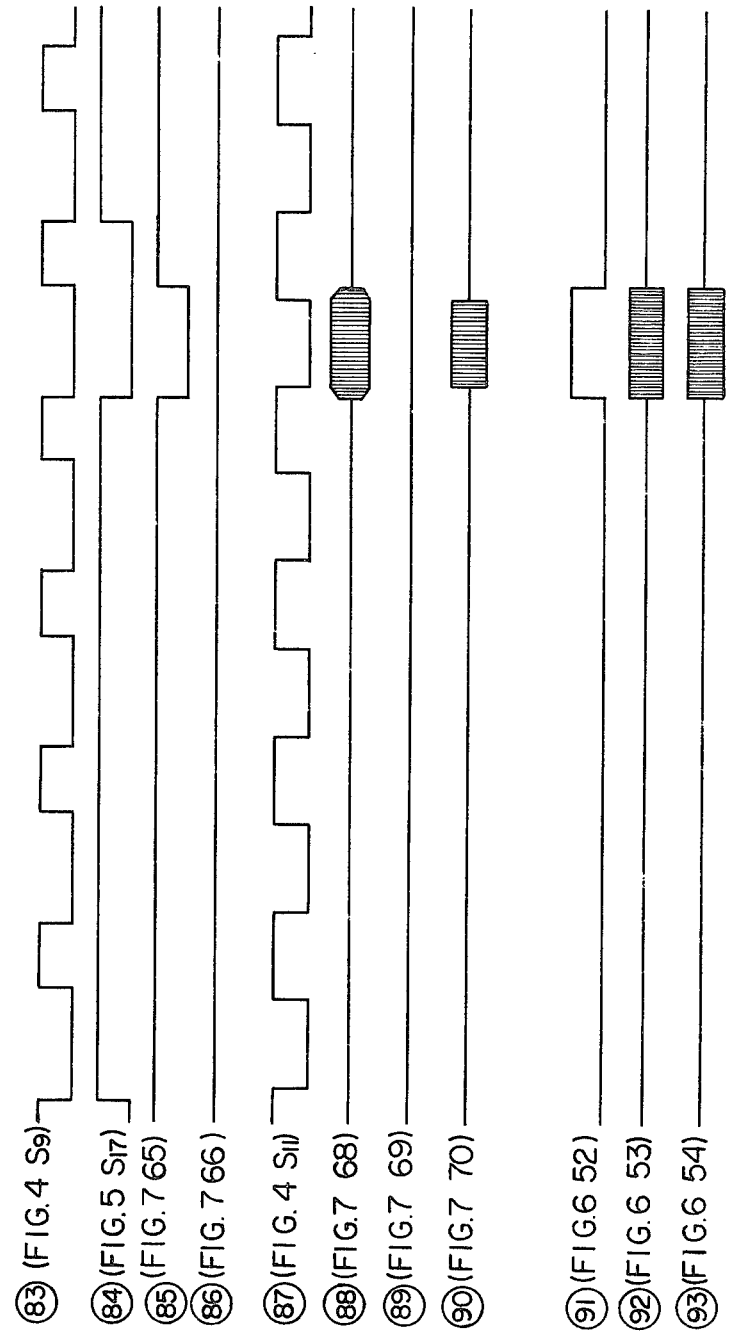

METHOD FOR ADJUSTING ROTARY HEAD TYPE MAGNETIC VIDEO RECORDING AND REPRODUCING APPARATUS

BACKGROUND OF THE INVENTION

1. Field of the Invention

The present invention relates to a system for precisely and readily adjusting and setting a mounting position of a composite control and audio head in a rotary head type magnetic video recording and reproducing apparatus (VTR).

2. Description of the Prior Art

Heretofore, in the VTR, approximately one field of television signal is recorded on a record track 1a or 1b, shown in FIG. 1, which is oblique to the longitudinal direction of a magnetic tape by two rotary heads A and B, and a control signal 3 is recorded in a predetermined positional relationship to the record track 1a or 1b by a control head 2 located at a position spaced by a predetermined tape length l from the mounting position of the rotary heads such that the heads A and B trace the record tracks 1a and 1b during playback.

An audio signal 5 is recorded on a record track on an edge of the tape by an audio head 4.

In such a VTR, the magnitude of the distance l is not critical when the signal is reproduced by the same VTR that used to record the signal, but when the signal is reproduced by a different VTR, precise tracking is not attained if the latter VTR has a different spacing distance. In this case, however, if the distance of spacing differs from the distance l by an integer multiple of control signal pitch m, precise tracking will be attained.

Heretofore, in positioning the mounting position of the control head 2, a reference magnetic tape recorded by a standard VTR is reproduced by a VTR under test and the mounting position of the control head which has been set near the point of the distance l is adjusted to a position at which an optimum video signal is reproduced (or optimum tracking is attained).

On the other hand, heretofore, the control head 2 and the audio head 4 are integrated in such a manner that magnetic gaps thereof align with each other so that the position of the audio head is established by the position of the control head.

In such a system where the control head and the audio head are integrated, if the mounting position of the control head is adjusted in the manner described above, it often occurs that the control head is positioned at a position spaced by an integer multiple of m from the predetermined distance l. In this case a problem of non-coincidence of the reproduced image and the reproduced sound occurs.

Particularly when the record tracks 1a and 1b are very narrow and closely arranged to increase the recording density, the magnitude of m is small and it is not possible to distinguish the distances l and l±m from each other by visual inspection. Accordingly, non-coincidence of image and voice is apt to occur.

SUMMARY OF THE INVENTION

It is an object of the present invention to provide a method for precisely positioning a composite head comprising a control head and an audio head at a precise spacing relative to a mounting position of a rotary head so that the rotary head can precisely trace record tracks during playback to attain complete coincidence of a reproduced image and a reproduced sound.

The above object can be attained by a method for adjusting a rotary head type magnetic video recording and reproducing apparatus comprising the steps of providing a reference rotary head type magnetic video recording and reproducing apparatus having a composite head comprising a control head and an audio head arranged in a predetermined positional relationship relative to a mounting position of a rotary head, recording a video signal intermittently for each group of a predetermined number of video tracks by the rotary head and recording an audio signal intermittently by the audio head in association with the intermittent recording of the video signal to prepare a reference tape, reproducing the reference tape by the rotary head type magnetic video recording and reproducing apparatus under test, and adjusting the position of a composite head of the rotary head type magnetic video recording and reproducing apparatus under test such that the intermittence relationship between a reproduced signal from the rotary head and a reproduced signal from the audio head coincides with the intermittence relationship between those signals during recording.

The above and other objects, features and advantages of the invention will be apparent from the following description of the preferred embodiments when taken in conjunction with the accompanying drawings.

BRIEF DESCRIPTION OF THE DRAWINGS

FIG. 1 shows a conventional record pattern on a magnetic tape of a helical scan type VTR;

FIG. 2 shows a block diagram of one embodiment of a VTR for recording a reference tape used in the present invention;

FIGS. 3a, 3b, 3c, and 3d illustrate several examples of the reference tape used in the present invention;

FIGS. 4 and 5 show waveforms for explaining the operation of the VTR shown in FIG. 2; and FIGS. 6, 7 and 8 show waveforms for explaining the operation of other embodiments.

DETAILED DESCRIPTION OF PREFERRED EMBODIMENTS

Figure 4:
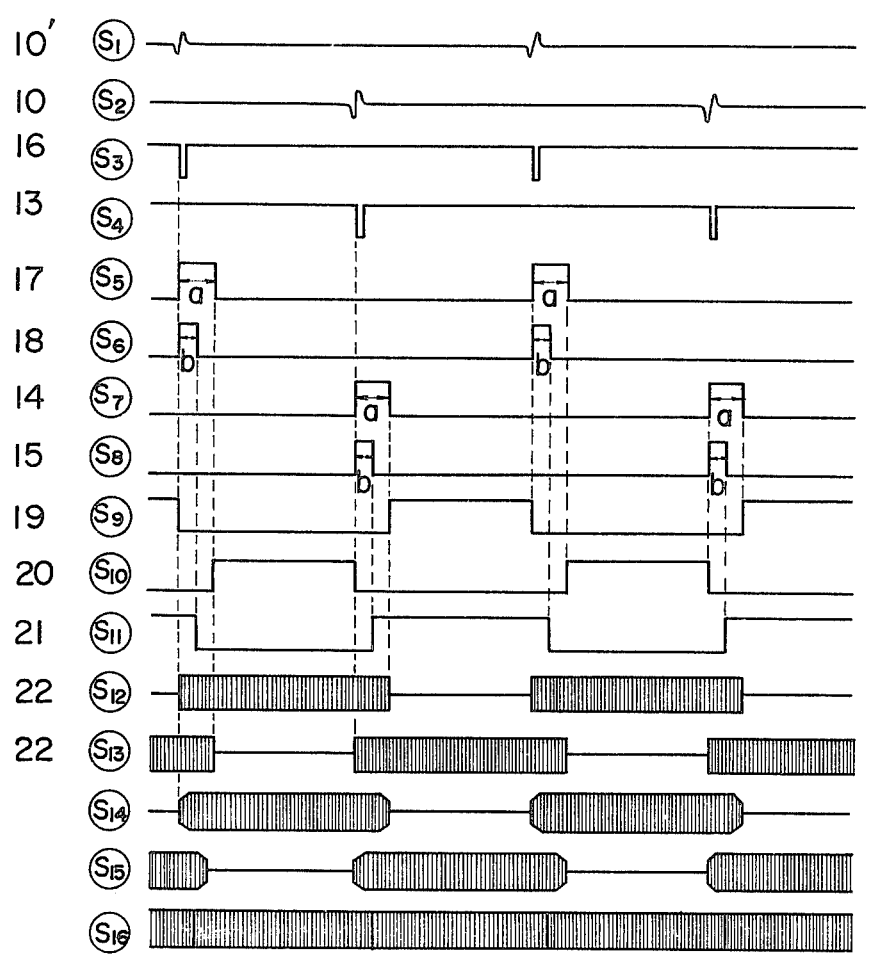

FIG. 2 shows an embodiment of a VTR for preparing a reference tape used in the present invention. In FIG. 2, like numerals show like parts to those in FIG. 1. Numeral 1 denotes a magnetic tape which is transported in the direction of an arrow by a capstan 6 and a pinch roller 7. Numeral 8 denotes a head bar which holds video signal recording and reproducing magnetic heads A and B at a positional relationship of approximately 180° and which is integrally mounted to a rotating shaft 8', and numeral 9 denotes a magnet mounted on a bottom surface of the head bar 8. Numerals 10 and 10' denote stationary mounted magnetic heads. By the combinations of magnet 9 with heads 10 and 10', rotating phase pulse detectors are formed for detecting rotating pulse phases of the magnetic heads A and B, respectively. The magnetic heads 10 and 10' are displaced by approximately 180° from each other. Numeral 11 denotes means for controlling a rotation speed of the head to control rotation speed of a drive motor 12 for rotating the head bar. During recording, it controls the rotation of the drive motor such that the phase of the signal from the rotating phase detecting magnetic head 10' and the phase of a vertical sync. signal of a composite video signal applied at a terminal 24 have a predetermined relationship to each other.

An output from the rotating phase detecting magnetic head 10 is amplified by a pulse amplifier 13, an output of which triggers monostable multivibrators 14 and 15. An output from the other rotating phase detecting magnetic head 10' is amplified by a pulse amplifier 16, an output of which triggers monostable multivibrators 17 and 18. Numeral 19 denotes a flip-flop circuit for generating a record current gate signal for the video signal recording and reproducing head A and numeral 20 denotes a flip-flop circuit for generating a record current gate signal for the video signal recording and reproducing head B. Numeral 21 denotes a flip-flop circuit for generating a head switching signal for converting a signal having overlapped portions reproduced by the video signal recording and reproducing heads A and B during playback, into a continuous signal. Numeral 24 denotes the input terminal for the composite video signal to be recorded and numeral 25 denotes an input amplifier an output of which is modulated by a recording video signal modulation circuit 26 and is thence supplied to a recording amplifier 22.

A portion of an output of the pulse amplifier 16 is supplied to a 1/5 frequency divider circuit 23. When preparing the reference tape in the present invention, a switch $SW_5$ is connected to a contact X so that the signal is supplied to a signal switching circuit 27. When the $SW_5$ is connected to a contact N (normal recording), the circuit 27 functions so that a signal of the flip-flop 19 is taken out, and when the switch $SW_5$ is connected to the contact X, a NAND output of the output of the 1/5 frequency divider 23 and the output of the flip-flop 19 is supplied to a recording amplifier 22. An output of the recording amplifier 22 is supplied via a contact R of a switch $SW_3$ to the video signal recording and reproducing heads A and B by which it is recorded on the tape 5. During playback, the signal reproduced from the tape 5 by the video signal recording and reproducing heads A and B is supplied to a reproducing amplifier 28 via a contact P of the switch $SW_3$. An output of the reproducing switching signal flip-flop 21 is supplied to the reproducing amplifier 28, in which the reproduced signal having an overlapped portion for the heads A and B is converted to a continuous signal without an overlapped portion. An output of the reproducing amplifier 28 is demodulated by a demodulator 29 while an output of an output amplifier 30 is taken out of a video signal output terminal 31.

On the other hand, an audio signal is applied to an input terminal 33 and through an input amplifier 39 and an audio signal processing circuit 34 to a gate circuit 42. The output of the 1/5 frequency divider 23 and the output of the flip-flop 19 are supplied to a gate signal switching circuit 36, which depending on whether the $SW_5$ is connected to the contact N or to the contact X, switches a normal recording gate signal or a reference tape preparing gate signal. In the normal recording state, a gate circuit 42 is continuously opened, and during the preparation of the reference tape, a NAND output of the 1/5 frequency divider 23 and the output of the flip-flop 19 is applied to the gate circuit 42 as a gating signal therefor. An output of the gate circuit 42 is supplied to a recording amplifier 35 in which it is mixed with an output of a bias oscillator 45 and a resulting output passes through a contact R of a switch $SW_4$ to an audio head 4. A signal reproduced by the audio head 4 is applied via a contact P of the switch $SW_4$ to a reproducing amplifier 37 where it is amplified and an amplified output is applied via an audio signal processing circuit 34 to an output amplifier 40 where it is further amplified and an amplified output is taken out of an output terminal 38.

A head rotation speed control system is now explained. As described above, the input signal applied to the video signal input terminal 24 is amplified by the input amplifier 25 and a vertical sync. signal is separated in a vertical sync. signal separation circuit 41. The separated vertical sync. signal is frequency divided by the factor of two resulting in a 30 Hz square wave in an NTSC standard television signal. An output of the vertical sync. signal separation circuit 41 is supplied to a control signal recording amplifier 43, thence through the contact R of the $SW_1$ to the control head 2 which records a control signal on the bottom edge of the tape 1. A portion of the output of the vertical sync. signal separation circuit 41 is applied via the switch $SW_2$ to a head rotation speed control means 11. A pulse produced in accordance with the rotational phase of the head bar 8 is amplified by an amplifier 16, thence applied to the head rotation speed control means 11, which compares phase of a signal associated with the vertical sync. signal with phase of signal associated with the rotational phase of the head bar 8 and amplifies a signal corresponding to an error output. The amplified error signal is then applied to a motor 12 so that the rotational phase of the head bar 8 is in synchronism with the phase of the vertical sync. signal of the composite video signal. During playback, the signal reproduced by the control head 2 is supplied via the contact P of the switch $SW_1$ to a reproduced control signal processing circuit 44, which amplifies the reproduced control signal and converts it to a square wave signal, which is supplied to the head rotation speed control means 11 via the contact P of the $SW_2$. The operation of the rotary head control system is the same as that during recording and the motor 12 is controlled such that the rotational phase of the head bar 8 is in synchronism with the control signal.

The operation of the embodiment described above is now explained with reference to signal waveforms.

In FIG. 4, $S_1$ represents an output of a rotational phase pulse generator 10', $S_2$ represents an output of a rotational phase pulse generator 10, and $S_3$ and $S_4$ represent outputs of the pulse amplifiers 16 and 13, respectively. $S_5$ represents an output of the monostable multivibrator 17 having a delay time a determined by the amount of overlap of the signals reproduced by the heads A and B, which is given by;

$$a = \frac{m+n}{W} \times \frac{1}{fV} \text{ (sec)}$$

where
 m: leading overlapping width (mm)
 n: trailing overlapping width (mm)
 W: recorded video signal width (mm)
 fV: vertical sync. signal frequency (Hz)
the values of m, n and W are the widths taken in the transverse direction of the tape as shown in FIG. 3. $S_6$ represents an output of the monostable multivibrator 18 having a delay time b determined by the amount of overlap, which is given by;

$$b = \frac{\frac{m+n}{2}}{W} \times \frac{1}{fV} \text{ (sec)}$$

Since m=n in normal case, $$a = \frac{2m}{W} \times \frac{1}{fV} \text{ (sec)}$$
$$b = \frac{m}{W} \times \frac{1}{fV} \text{ (sec)}$$

$S_7$ and $S_8$ represent outputs of the monostable multivibrators 14 and 15 having delay times a and b, respectively, as defined above. $S_9$ represents an output of the flip-flop 19 which functions to gate the record signal during recording to cause the record current to be supplied to the head A in a relation shown by $S_{12}$. $S_{10}$ represents an output of the flip-flop 20 which causes the recording current to be supplied to the head B in a relation as shown by $S_{13}$ for recording the signal on the tape 5.

During playback, signals $S_{14}$ and $S_{15}$ are reproduced from the heads A and B and switched by the output $S_{11}$ of the flip-flop 21 to produce a continuous signal $S_{16}$.

The record of the reference tape which is the characteristic of the present invention is now explained.

In FIG. 5, $S_{17}$ represents an output of the 1/5 frequency divider 23 and $S_{19}$ represents an output of the flip-flop 20 like $S_{10}$.

$S_{18}$ represents an output of the signal switching circuit 27 for the NAND output of the output $S_{17}$ of the 1/5 frequency divider 23 and the output $S_9$ of the flip-flop 19 when the $SW_5$ is connected to the contact X.

$S_{21}$ represents a recording current flowing in the head A the recording current to which is gated by the signal $S_{18}$, and also represents a reproduced output from the head A (the same relation to that between $S_{12}$ and $S_{14}$).

$S_{22}$ represents a recording current flowing in the head B the recording current to which is gated by the signal $S_{19}$, and it is similar to $S_{13}$. It also represents a reproduced output from the head B.

$S_{23}$ represents a continuous signal derived by switching the signal $S_{21}$ reproduced by the head A and the signal $S_{22}$ reproduced by the head B by the head switching signal, that is, by the output $S_{20}$ (like $S_{11}$) of the flip-flop 21.

$S_{27}$ represents an output of the audio gate signal switching circuit 36. The gate circuit 42 produces an output $S_{24}$. $S_{25}$ represents an output of the reproducing amplifier 37 when the signal is self-recorded and self-reproduced.

In this case, the non-signal periods for the output $S_{23}$ of the video reproducing amplifier 28 and the output $S_{25}$ of the audio reproducing amplifier 37 coincide with each other. However, if the signals are reproduced by a reproducing VTR having an audio control head arranged one pitch offset, the output of the audio reproducing amplifier 37 becomes the output $S_{26}$. Thus the non-signal periods of the output $S_{23}$ of the video reproducing amplifier 28 and the output of the audio reproducing amplifier 37 are offset and they do not coincide with each other in the non-signal periods. This invention proposes to adjust the position of the offset audio control head so as to bring the relation in the non-signal period of the outputs $S_{23}$ and $S_{26}$ into coincidence with that of the $S_{23}$ and $S_{25}$.

Accordingly, by preparing the reference tape having non-recorded portions for the video signal and the audio signal which occur at the same timing, by the reference VTR in which the audio control head is arranged as specified, reproducing the reference tape by the individual VTR under test, and adjusting the position of the audio control head of the VTR under test such that the non-recorded portions of the two signals coincide with each other, the risk of mounting the audio control head at a position one to several pitch offset can be avoided. As to fine tuning within one pitch, a peak point of the output of the video reproducing amplifier may be searched as in the conventional manner.

FIG. 3 schematically shows a record pattern of the reference tape in accordance with the present invention, in which numeral 51 denotes a non-record track which appears for every five record tracks, and numeral 48 denotes a non-record band for the audio signal which appears to correspond to the non-recorded band 51. The characer H designates a horizontal sync. period, the width W corresponds in time to 262.5H, and the widths m, n correspond to 4H. The symbol Vt designates tape velocity and fV designates vertical sync. signal frequency. The four recorded video and audio signal relations shown in FIG. 3 correspond to the embodiments of FIGS. 4 and 5; FIG. 6; FIG. 7; and FIG. 8 respectively.

FIG. 6 shows signal waveforms in another embodiment. In this case, an inverted signal of an output signal $S_{27}$ in FIG. 5 is produced at the output of the audio gate signal switching circuit 36 as a signal 52 in FIG. 6. Thus an output for the audio signal from the gate circuit 42 is represented by a signal 53 and a reproduced output, that is, an output of the reproducing amplifier 37 is represented in a shape such as shown by a signal 54.

Therefore, by reproducing the recorded tape by the VTR under test while adjusting the control head such that the non-recorded portion of the output 62 of the reproducing amplifier 28 for the video signal coincide in position with the signal portion of the output 54 of the reproducing amplifier 37 for the audio signal, the positioning of the audio and control heads can be attained.

FIG. 7 shows a further embodiment, in which numeral 63 denotes an output of the flip-flop 19 and numeral 64 denotes an output of the 1/5 frequency divider 23. Since the output 63 and the output 64 are inverted in the signal switching circuit 27 and the $SW_5$ is connected to the contact X, the signal from the $SW_5$ is a low level signal, and a NAND output of the inverted output of the signal from the $SW_5$ and the above two inverted outputs is represented by a signal 65 which is an output of the signal switching circuit 27. Numeral 66 denotes an output of the signal switching circuit 27' (not shown), which is a NAND output of the inverted output of the flip-flop 20 and the common level of the $SW_5$. Numeral 67 denotes an output of the flip-flop 21, and numerals 68, 69 and 70 denote a reproduced output of the head A, a recording current flowing in the head B and an output of the video signal reproducing amplifier 28. In this case, no current flows in the head B. Accordingly, the head B may be disconnected during recording. Numeral 80 denotes a gate signal for the audio signal described above, numeral 81 denotes an output of the audio gate circuit 42 and numeral 82 denotes an output of the audio reproducing amplifier 37. In this embodiment, again, by reproducing the recorded tape by the VTR under test and adjusting the heads such that the signal portion of the output of the video reproducing amplifier 28 and the non-recorded portion of the output of the audio reproducing amplifier 37 coincide with each other, the positioning of the audio and control heads can be attained.

FIG. 8 shows another embodiment in which outputs 83, 84, 85, 86, 87, 88, 89 and 90 correspond to the outputs 63, 64, 65, 66, 67, 68, 69 and 70 shown in FIG. 7, respectively. In this embodiment, the inverted signal of the output signal 27 shown in FIG. 5 is an output of the audio gate signal switching circuit 36, that is, a signal 91 in FIG. 8 is produced. In this arrangement, an output of the gate circuit 42 for the audio signal is represented by a signal 92, and a reproduced output, that is, an output of the reproducing amplifier 37 is represented by a signal 93 (FIG. 6.54). In this embodiment, the audio signal is recorded on those portions of the magnetic tape which correspond to the portions on which the video signal is recorded. By adjusting the heads such that the output of the video reproducing amplifier 28 and the output of the audio reproducing amplifier 37 coincide, the positioning of the audio and control heads can be attained.

In the present embodiment, the gate circuit is provided for the recording operation so that the signal is recorded precisely at the front and rear overlapping areas. The same effect can be attained in a usual VTR where the video signal is continuously supplied so that the signal is recorded by the amount determined by the wrap angle of the tape to the rotary heads A and B, if the video signal is gated by the same gate signal as that for the audio signal. In this case, the factor of frequency division of the frequency divider 23 may be determined within a range in which the offset of the audio control head is obviously recognized by changing the control pulse pitch $P_c = 2V_t/fV$, where $V_t$ is a tape speed.

As described hereinabove, according to the present invention, the positioning of the audio and control heads, particularly when the control pulse pitch is small, that is, the tape speed is low, can be readily and precisely attained.

Furthermore, the reference tape prepared by the apparatus explained in FIG. 5 enables the adjustment of linearity of video track and the adjustment of playback switching position, etc. In addition, if the tape has an audio track recorded with, for example, 6 kHz sinusoidal wave, it can be used to adjust the azimuth and level of the audio head.

What is claimed is:

1. A method for testing and adjusting a rotary head type magnetic video recording and reproducing apparatus having a first rotary head for recording and reproducing a video signal and a first composite head having a first control head and a first audio head, which comprises the steps of:

preparing a reference tape by recording a video signal intermittently to produce at least one unrecorded video track on said tape for every predetermined number of video tracks formed on said tape, said intermittent video signal being recorded by the scan of a second rotary head of a reference rotary head type magnetic video recording apparatus having a second composite head including a second control head and a second audio head which are arranged in a predetermined positional relation relative to a mounting position of said second rotary head with the head gaps of said second control head and said second audio head being in a predetermined positional relation, and recording an audio signal on said tape intermittently by said second audio head in synchronism with the intermittence of said video signal;

reproducing the intermittently recorded video and audio signals on said reference tape by said first rotary head and said first composite head of the rotary head type magnetic video recording and reproducing apparatus under test; and adjusting the position of said first composite head with respect to a mounting position of said first rotary head such that the intermittence relation between a reproduced video signal from said first rotary head and a reproduced audio signal from said first audio head coincides with the intermittence relation between the video and audio signals during recording.

2. A method for testing and adjusting a rotary head type magnetic video recording and reproducing apparatus according to claim 1, wherein said reference tape includes a video signal track area scanned obliquely relative to the longitudinal direction of the tape by said second rotary head of said reference rotary head type magnetic recording apparatus, and an audio signal track area and control signal track area traced by said second composite head of said reference rotary head type magnetic recording apparatus, said video signal track area including, after recording, at least one non-recorded video track for every predetermined number of video signal tracks and said audio signal track area including, after recording, non-recorded audio bands related to said non-recorded video tracks.

3. A method for testing and adjusting a rotary head type magnetic video recording and reproducing apparatus according to claim 1, wherein said reference tape includes a video signal track area scanned obliquely relative to the longitudinal direction of the tape by said second rotary head of said reference rotary head type magnetic recording apparatus, an audio signal track area and a control signal track area traced by said second composite head of said reference rotary head type magnetic recording apparatus, said video signal track area including, after recording, at least one non-recorded video track for every predetermined number of video signal tracks and said audio signal track area including, after recording, recorded audio bands only on portions of said tape which are related to said non-recorded video tracks.

4. A method for testing and adjusting a rotary head type magnetic video recording and reproducing apparatus according to claim 1, wherein said reference tape includes a video signal track area scanned obliquely relative to the longitudinal direction of the tape by said second rotary head of aid reference rotary head type recording apparatus and an audio signal track area and a control signal track area traced by said second composite head of said reference rotary head type magnetic recording apparatus, said video signal track area including, after recording, at least one recorded video track for every predetermined number of video signal tracks and said audio signal track area including, after recording, non-recorded audio bands related to said recorded video tracks.

5. A method for testing and adjusting a rotary head type magnetic video recording and reproducing apparatus according to claim 1, wherein said reference tape includes a video signal track area scanned obliquely relative to the longitudinal direction thereof by said second rotary head of said reference rotary head type magnetic recording apparatus and an audio signal track area and a control signal track area traced by said second composite head of said reference rotary head type magnetic recording apparatus, said video signal track area including, after recording, at least one recorded video track for every predetermined number of video signal tracks and said audio signal track area including, after recording, recorded audio bands only on portions of said tape which are related to said recorded video tracks.

* * * * *